Sept. 7, 1926. 1,598,729
W. G. KOUPAL ET AL
APPARATUS FOR MAKING SHEET GLASS
Filed Jan. 13, 1926    3 Sheets-Sheet 3
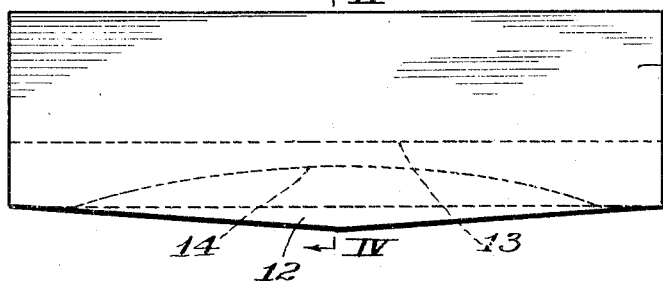
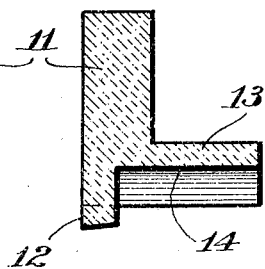
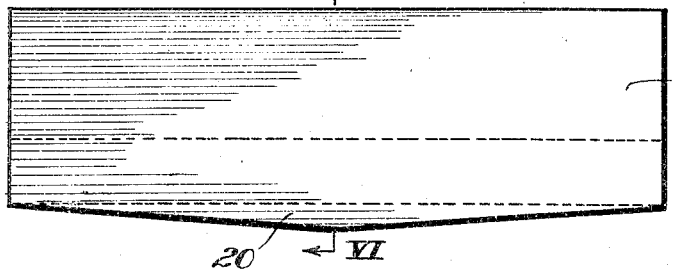
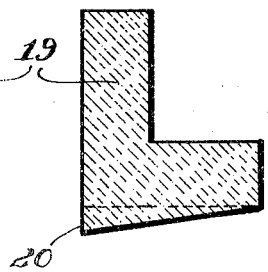
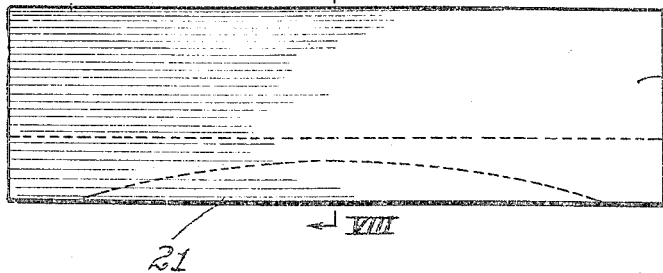
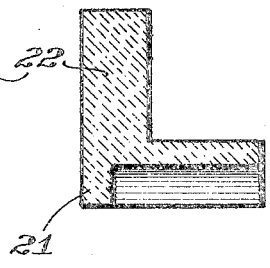

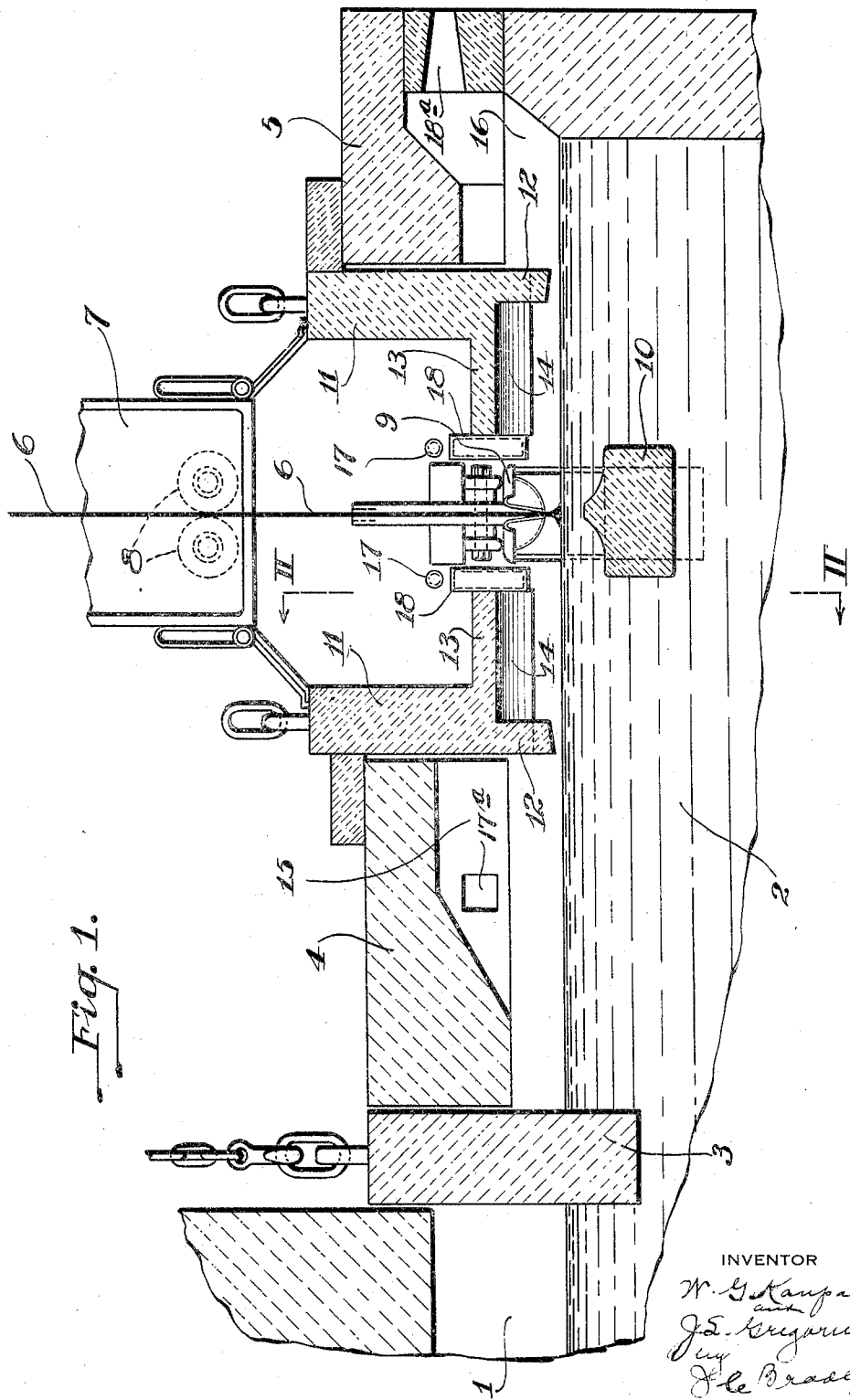

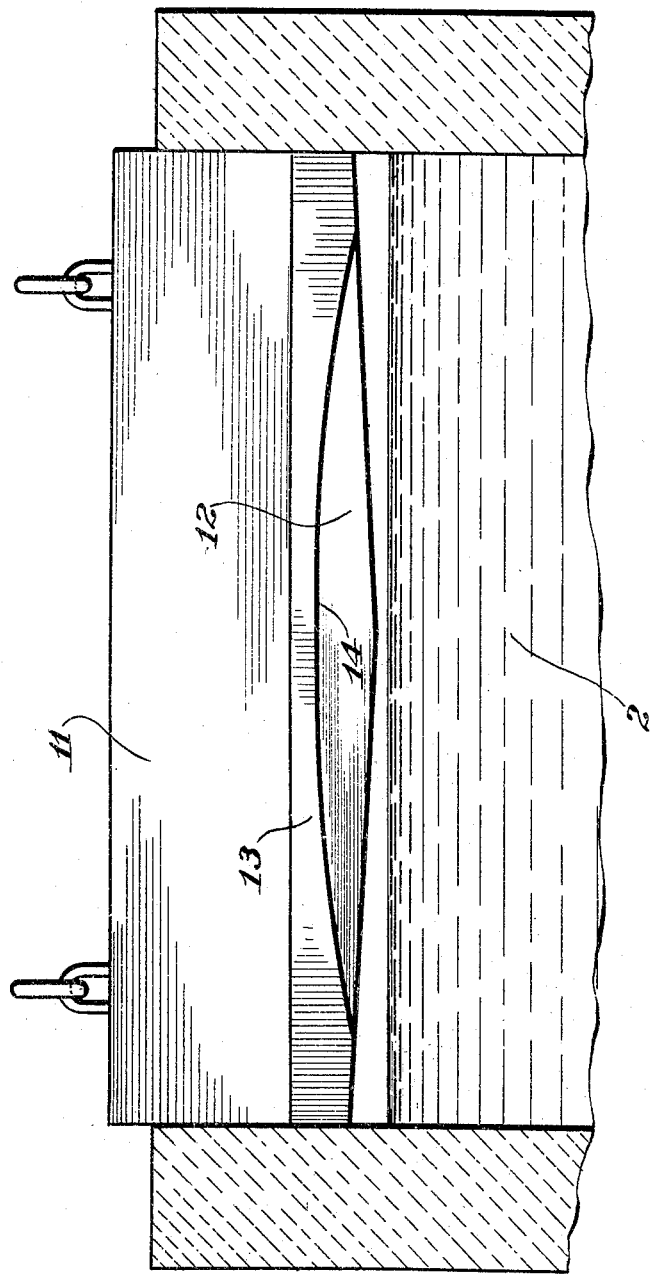

Patented Sept. 7, 1926.

1,598,729

UNITED STATES PATENT OFFICE.

WALTER G. KOUPAL AND JOSEPH S. GREGORIUS, OF MOUNT VERNON, OHIO, ASSIGNORS TO PITTSBURGH PLATE GLASS COMPANY, A CORPORATION OF PENNSYLVANIA.

APPARATUS FOR MAKING SHEET GLASS.

Application filed January 13, 1926. Serial No. 80,947.

The invention relates to apparatus for making sheet glass and particularly to the drawing tank construction. It has for its principal objects the provision of an improved arrangement of the clay work over the bath, designed so as to secure a reduction of the temperature at the central portion of the bath as compared with that at the side portions. The glass bath at its central portion normally has a somewhat higher temperature than the side portions, due to the greater dissipation of heat at the sides of the bath incident to the conducting effect of the side walls of the tank. This tends to give a sheet which is hotter at the center and consequently thinner than at the edge portions. This condition also tends to cause the sheet to warp and increases the breakage. The present invention is designed to equalize the temperature of the bath, so that the sheet is of uniform temperature and thickness. One embodiment of the invention is illustrated in the accompanying drawings wherein:

Figure 1 is a vertical section through a glass drawing tank equipped with the invention. Fig. 2 is a vertical section on the line II—II of Fig. 1. Figs. 3 and 4 are a detail rear elevation of one of the L-blocks and a vertical section on the line IV—IV of Fig. 3 respectively. And Figs. 5 and 6 and 7 and 8 are detail views of L-blocks showing modifications, Fig. 6 being a section on the line VI—VI of Fig. 5 and Fig. 8 being a section on the line VIII—VIII of Fig. 7.

Referring to the general arrangement of Fig. 1, the reference numeral 1 indicates the end of a glass melting tank preferably of the regenerator type and 2 is a forehearth or drawing tank leading from the end of the melting tank. A gate 3 of refractory material is employed for partially segregating the glass in the tank 1 from that in the tank 2. A cover for the tank 1 is provided in the form of the blocks 4 and 5 spaced above the surface of the glass, and between these blocks is a drawing opening through which the sheet 6 is drawn upwardly through a leer 7. Any desired form of drawing means may be employed, the one illustrated being a series of pairs of rolls 8 mounted in the leer 7 and engaging the sides of the sheet, this being a well-known means for drawing glass vertically. At the edges of the sheet are the edge holding devices 9, preferably of the type shown in the Slingluff Patent No. 1,549,513 of August 11, 1925, and beneath the line of generation of the sheet is a refractory draw-bar 10. The edge holding devices and the draw-bar are details of construction which have nothing to do with the present invention, but are illustrated for the purpose of showing a complete installation.

On each side of the sheet is an L-block 11, each of which has a vertical flange 12 and a horizontal portion 13. The flange 12 is bowed down at its center, as indicated in Figs. 2 and 3, so that it is closer to the surface of the bath at the center than at the edges. The horizontal portion 13, on the other hand, is arched upwardly at its central portion, as indicated at 14 in Figs. 2 and 3, so that the face of the arch is more remote from the surface of the glass at its center than at its edges.

As heretofore indicated, the L-block construction is designed to reduce the temperature of the glass at the center of the bath as compared with its edges. The bowing down of the flange 12 tends to produce this result, as does also the arch in the reverse direction of the horizontal portion 13 of the block. The spaces 15 and 16 back of the L-blocks and lying between the surface of the glass and the blocks 4 and 5 are heated by suitable burners working through the openings 17ᵃ and 18ᵃ, and the hot gases contained in these spaces are carried forward beneath the flanges 12 due to the stack function of the leer casing and to the fact that the incoming gases from the burners produce a pressure in the spaces tending to cause an outflow beneath the flanges 12, 12. Since the flanges are closer to the bath at the center than at the edges a larger proportion of such gases will pass between the flanges and the glass at their edge portions than at their center portions and the heating effect of these gases is, therefore, greater at the sides of the bath than at the center. As a result, this arrangement has a tendency to equalize the temperature of the surface glass from one side of the bath to the other, as such glass is normally at a somewhat lower temperature adjacent the side walls of the tank than at the central portion of the bath. The arch arrangement of the horizontal portions 13, 13 tend to give a greater heating effect at the sides of the bath than at the center, as the intensity of the heat reflected from the clay walls 13, 13 decreases with the distance from the bath, and the absorption of heat by the air lying between the walls 13 and the bath is greater at the center where the layer of air has the greatest thickness. The construction of the flange 12 and the arch 13, therefore, cooperates to equalize the temperature of the glass from one side of the bath to the other, so that the glass is no hotter at the center of the bath than at the edges and as a result, the glass sheet of uniform thickness is produced. The modifying effect of the L-blocks upon the glass may be adjusted by raising and lowering them so as to secure the same temperature condition on both sides of the sheet.

Suitable water coolers 17 and 18 are also preferably employed on each side of the sheet, such devices serving to chill the glass bath by absorbing heat therefrom, this detail of construction also being one which is well-known in the art and constitutes no part of the present invention.

Figs. 5 and 6 show a modification in which the L-block 19 has its lower surface 20 bowed, as indicated in Fig. 5, the arch arrangement of the Fig. 1 construction being omitted in this modification, and the blowing down of the block being entirely depended upon to secure the necessary modification of temperature in the glass bath.

Figs. 7 and 8 illustrate a further modification in which the flange 21 of the L-block 22 has its lower edge straight, as indicated in Fig. 7. With this block, the horizontal portion 23 is arched as in the Fig. 1 construction, this arching being relied upon to give the desired temperature modification. From the modifications it is apparent that the two features of bowing a part of the block down and arching another portion of the block may be employed separately, if desired; the most effective result, however, being secured when both of these features are used in the same L-block.

What we claim is:

1. The combination with a glass tank, having a refractory top spaced above the glass with a drawing opening therethrough and sheet drawing means for drawing a sheet upward from the bath with its line of generation lying transversely of the tank, of a refractory block extending transversely of the tank on each side of the drawing opening and having its lower edge extending down below said top to a level adjacent the surface of the glass bath in the tank, the said bottom edge of each block being bowed down so that it is closer to the bath at the central portion thereof than at the edges.

2. The combination with a glass tank, having a refractory top spaced above the glass with a drawing opening therethrough and sheet drawing means for drawing a sheet upward from the bath with its line of generation lying transversely of the tank, of a refractory block extending transversely of the tank on each side of the drawing opening and having its lower edge extending down below said top to a level adjacent the surface of the glass bath in the tank, the portion of each block on the side toward the sheet having its lower surface cut away above the level of said bottom edge so as to form an arch which approaches the bath from its central portion to its side portions.

3. The combination with a glass tank, having a refractory top spaced above the glass with a drawing opening therethrough and sheet drawing means for drawing a sheet upward from the bath with its line of generation lying transversely of the tank, of a refractory block extending transversely of the tank on each side of the drawing opening and having its lower edge extending down below said top to a level adjacent the surface of the glass bath in the tank, the said bottom edge of each block being bowed down so that it is closer to the bath at the central portion thereof than at the edges, and the portion of each block on the side toward the sheet having its lower surface cut away above the level of said bottom edge so as to form an arch which approaches the bath from its central portion to its side portions.

4. The combination with a glass tank, having a refractory top spaced above the glass with a drawing opening therethrough and sheet drawing means for drawing a sheet upward from the bath with its line of generation lying transversely of the tank, of a refractory block L-shape in cross section extending transversely of the tank on one side of the drawing opening and having a vertical flange at its bottom portion extending down adjacent the surface of the glass bath in the tank, the lower face of said block on the side of the sheet toward the drawing opening being arched so that such lower face at its central portion is farther from the glass bath than at its sides.

In testimony whereof, we have hereunto subscribed our names this 8th day of January, 1926.

WALTER G. KOUPAL.
JOSEPH S. GREGORIUS.